Sept. 23, 1958     D. C. HAMMAN     2,852,828
MOLDING CLIP
Filed Jan. 27, 1955
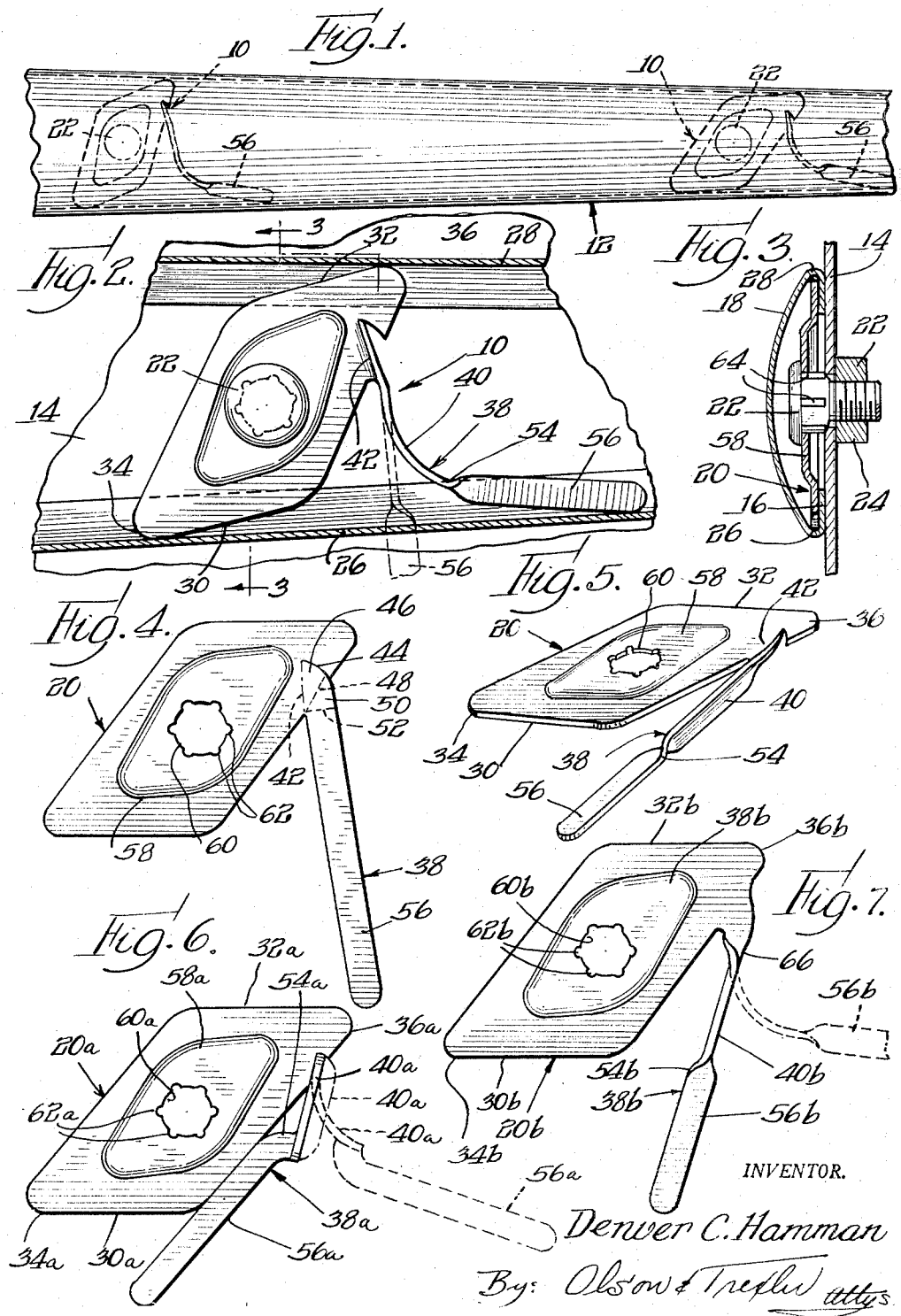
INVENTOR.
Denver C. Hamman
By: Olson & Treflin attys

United States Patent Office 2,852,828
Patented Sept. 23, 1958

2,852,828

MOLDING CLIP

Denver C. Hamman, Elgin, Ill., assignor to Illinois Tool Works, Chicago, Ill., a corporation of Illinois Application January 27, 1955, Serial No. 484,464

3 Claims. (Cl. 24—73)

The present invention relates to novel fastening devices and more particularly, to novel fastening devices for mounting channel shaped articles such as molding strips.

Tapered molding strips are often used, especially in the automotive industry, which strips are secured to a panel of the automobile by a plurality of spaced fastening devices. It is an important object of the present invention to provide a novel fastening device of simple and economical construction which may be used for holding tapered molding strips or molding strips of various widths.

A more specific object of the present invention is to provide a novel fastening device or clip which includes a sheet material head which may be twisted so as to be accommodated between opposite sides of molding strips of various widths or of a tapered molding strip, and which includes integral finger means formed in a novel and simple manner for engaging one side of the moulding strip and yieldably biasing or twisting the head until it is securely wedged between the opposite sides of the molding strip.

A further object of the present invention is to provide a novel fastening device or clip of the above described type wherein an outer end of said flexible finger means is arranged so that it may be accommodated in a narrow space between an outer surface and an inturned flange of a molding strip.

Other objects and advantages of the present invention will become apparent from the following description and the accompanying drawings wherein:

Fig. 1 is an elevational view showing a plurality of fastening devices embodying the principles of this invention assembled with a tapered channel member or molding strip;

Fig. 2 is an enlarged view partially in section showing the novel fastening device of this invention assembled with a molding strip;

Fig. 3 is a cross sectional view taken along line 3—3 in Fig. 2;

Fig. 4 is a perspective view of a sheet material blank from which the head and finger portions of the fastening device shown in Figs. 1 through 3 may be formed;

Fig. 5 is a perspective view of the sheet material head and finger portions of the fastening device shown in Figs. 1 through 3;

Fig. 6 is a plan view showing a modified form of the present invention; and

Fig. 7 is a plan view showing another modified form of the present invention.

Referring now more specifically to the drawings wherein like parts are designated by the same numerals throughout the various figures, a fastening device 10 embodying the principles of this invention is shown in Figs. 1 through 5, which fastening device is adapted to mount a channel member such as a molding strip 12 to an apertured workpiece 14. The molding strip 12 may be of any known construction which includes flanges 16 and 18 extending inwardly from opposite sides thereof over which flanges a sheet material head portion 20 of the fastening device is adapted to extend. The fastening device also includes a stud member 22 connected with the head portion and adapted to extend through an aperture in the workpiece for cooperation with a nut 24 or any other suitable securing device.

The head portion 20 which is preferably made from resilient sheet metal is elongated to a rhomboidal shape, as shown best in Figs. 2 and 4 so that it is adapted to traverse the space between opposite walls 26 and 28 of the channel shaped molding strip. Opposite ends 30 and 32 of the head are substantially parallel to each other and are beveled or inclined at an angle other than 90° with respect to the longitudinal axis of the head. With this structure the head is adapted to traverse the molding strip and engage the opposite sides thereof regardless of the width of the molding strip, within limits, since the head may be twisted from the position shown at the right hand end of Fig. 1 to the position shown at the left hand end of Fig. 1 wherein diagonally opposite corners 34 and 36 engage the opposite sides or walls of the molding strip. It is to be noted that the corners 34, 36 at the ends of the major axis of the head or plate are each of relatively small radius of curvature.

In order resiliently to bias or twist the head portion with respect to the molding strip for secure engagement with the walls of the molding strip, the head is provided with integral finger means 38 extending laterally therefrom. In accordance with the feature of this invention, the finger means 38 includes a first portion 40 adjacent the head and joining the head along a bend 42, the line of which extends generally parallel to the normal position of the finger means which is shown in broken lines in Fig. 2. When forming the finger means, the head is first slit along the line 44 shown in Fig. 4 and the inner end 46 of the portion 40 is bent upwardly with respect to the head along the line 42, which line, it will be noted, is disposed entirely within the periphery of the head. In order to provide a strong junction between the finger means and the head, the end 46 between the lines 42 and 48 is bent through an angle of about 45° with respect to the head, and the portion 50 between the lines 48 and 52 is bent further to dispose the remainder of the flexible portion in a plane traversing and arranged in an angle of about 90° to the plane of the head. Thus, the major transverse cross sectional dimension of the finger portion 40 traverses the head so that this finger portion may flex relatively easily laterally with respect to the head. An intermediate portion 54 of the finger means is twisted about the longitudinal axis of the finger means through an angle of about 90° so that an outer free end portion 56 of the finger means is disposed in a plane substantially parallel to the head. Furthermore, the finger means is preferably formed so that the outer end portion 56 is disposed in the plane of the head. With this arrangement it will be appreciated that the end portion 56 may be easily inserted into the space between the outer wall and the inturned flange of the molding strip.

The head of the fastening device is assembled with the molding strip either by sliding it into the end of the strip and over the inturned flanges thereof or by inserting it between the flanges and then turning it to the position shown in Fig. 2. Thereafter, the finger means is flexed from the position shown in broken lines in Fig. 2 and snapped into the position shown in full lines. In this position, the resilient finger means yieldably biases or twists the head in a counterclockwise direction, as viewed in Fig. 2, until opposite end portions of the head firmly engage opposite walls of the molding strip. The free end of the finger or arm 38 cooperates with the adjacent arcuate edge of the portion 34 disposed on one side of the major axis of the plate, and the free end of the arm 38 also cooperates with the arcuate edge of the portion 36 disposed on the opposite side of the major axis of the plate in maintaining contact of the arcuate edges with the opposed flanges of the molding strip. The spring arm extends at an angle of less than 90° with respect to the plate margin from which it extends. This will be apparent from the positions shown in Fig. 1 and bearing in mind that the shorter straight margins will preclude turning of the plate beyond the limits set thereby. Thus, the spring arm extends from the supporting side edge of the plate without reverse curvature in the arm between its free extremity and its intersection with the side edge of the plate from which it extends. This construction minimizes the stress to which the arm is subjected during use and in shifting the arm from the inoperative positions of Figs. 4 or 6 to an installed operative position.

The head 20 is provided with a central raised portion 58 having an aperture 60 therein for receiving the shank of the stud member 22. Preferably, the head is provided with a plurality of notches 62 spaced around the aperture for receiving complementary ribs 64 on the stud member so that relative rotation between the stud member and the head is prevented.

In Fig. 6 there is shown a modified form of the present invention which is similar to the above described structure as indicated by the application of identical reference numerals with the suffix "a" added to corresponding elements. This embodiment differs only in the manner in which the finger means 38 is formed. More specifically, instead of initially forming the finger means 38a straight like the finger 38 as shown in Fig. 4, the intermediate portion 54a of the finger means 38a extends back toward the head so that the outer end portion 56a is disposed along one margin of the head. It will be appreciated that this arrangement will enable a considerable savings in stock material to be effected. In order to finish the finger means 38a the portion 40a which originally occupied the position shown in dot-and-dash lines is folded so that it is disposed in a plane substantially perpendicular to the plane of the head. This enables the portion 40a to be flexed laterally of the head as shown by the dash lines in Fig. 6.

Fig. 7 shows another modified form of the present invention which is similar to the above described embodiments as indicated by the application of identical reference numerals with the suffix "b" added to corresponding elements. In this embodiment the finger portion 40b is connected directly with a marginal edge of the head 20b, and an inner end of the portion 40b is twisted generally about the longitudinal axis of the finger as at 66 so that the remainder of the portion 40b is disposed in a plane substantially perpendicular to the plane of the head. This embodiment has the advantage in that it eliminates the necessity for slitting and thereby weakening the head.

From the above description it is seen that the present invention has provided a novel fastening device which is of simple and economical construction and which is adapted for application to tapered molding strips or molding strips of various widths. More specifically, it is seen that the present invention has provided a novel fastening device having a sheet metal head and an integral finger wherein the finger is formed in a novel manner so as to provide a flexible portion for yieldably biasing the head in the desired manner and an end portion for engaging a wall of the molding strip, which end portion is adapted to overlie an inturned flange of the molding strip.

While the preferred embodiments of the present invention have been shown and described herein, it is obvious that many structural details may be changed without departing from the spirit and scope of the appended claims.

The invention is claimed as follows:

1. A fastening device for mounting generally channel-shaped work strips, such as molding strips and the like having in-turned flanges along the longitudinal side edges thereof forming opposed longitudinal recesses, said device comprising an elongated plate for spanning the distance between the in-turned flanges, said plate being of rhomboidal shape with each pair of acutely converging side edges merging at their outer extremities with a substantially arcuate edge of relatively small radius of curvature, the maximum distance between said opposed arcuate edges defining the major axis of said rhomboidal plate, each pair of side edges merging with said arcuate edges being angularly disposed with respect to each other so as to permit said arcuate edges to occupy a position for contacting the opposed flanges of the work strip throughout the major portion of the normal angular displacement about an axis normal and substantially central with respect to said plate in accommodating the plate to variously spaced work strip flanges, a spring arm extending from one of the side edges of said plate in a direction without reverse curvature in the arm between the free extremity thereof and its intersection with the side of the plate from which it extends, whereby to minimize the stress to which the arm is subjected in shifting the same from inoperative to operative positions, and said arm in operative position cooperating with portions of the said arcuate edges on opposite sides of the major axis of the plate with the free extremity of the arm and the portion of the arcuate edge on the same side of the major axis adapted to contact the same inturned flange of the strip to maintain contact of the aforesaid opposed arcuate edges with complementary opposed flanges of the work strip, and means on the plate to enable it to be attached to a support.

2. A fastening device as defined by claim 1 wherein the spring arm is connected with one of the edges of the plate in the vicinity of one of said arcuate work contacting edges.

3. A fastening device as defined by claim 1 wherein the spring arm is formed integral with and has a fixed extremity thereof struck from a portion of the plate.

References Cited in the file of this patent

UNITED STATES PATENTS

| | | |
|---|---|---|
| 2,605,871 | Kress et al. | Aug. 5, 1952 |
| 2,695,435 | Bedford | Nov. 30, 1954 |
| 2,709,286 | Bedford | May 31, 1955 |
| 2,713,185 | O'Herron | July 19, 1955 |
| 2,716,263 | Flora | Aug. 30, 1955 |